United States Patent [19]

Mlinaric et al.

[11] Patent Number: 4,508,485

[45] Date of Patent: Apr. 2, 1985

[54] LIFTING DEVICE

[75] Inventors: Jerry Mlinaric, 8 Highland Ct., Dandenong, Victoria; William Leary, Sheldon Padonstor Rd., Emerald, Victoria; Robert J. Mummery, Noble Park, all of Australia

[73] Assignees: Jerry Mlinaric, Dandenong; William Leary, Emerald, both of Australia

[21] Appl. No.: 339,457

[22] PCT Filed: May 6, 1981

[86] PCT No.: PCT/AU81/00050

§ 371 Date: Jun. 29, 1983

§ 102(e) Date: Jun. 29, 1983

[87] PCT Pub. No.: WO81/03310

PCT Pub. Date: Nov. 26, 1981

[30] Foreign Application Priority Data

May 21, 1980 [AU] Australia .............................. PE3665

[51] Int. Cl.³ .......................... B62B 3/04; B62B 3/06
[52] U.S. Cl. .................................................. 414/458
[58] Field of Search ................... 414/419–422, 414/424, 425, 457–459, 452–454, 444, 449, 450, 546; 254/120, 131; 280/47.12, 47.26, 47.34, 47.35, 47.37 R

[56] References Cited

U.S. PATENT DOCUMENTS

| 528,011 | 10/1894 | McElfresh | 414/458 |
| 1,717,377 | 6/1929 | Forry | 414/458 X |
| 1,862,299 | 6/1932 | Ciccone | 414/450 |
| 2,779,494 | 1/1957 | Kikuchi | 414/450 |
| 3,378,155 | 4/1968 | Steiner | 414/458 |

FOREIGN PATENT DOCUMENTS

| 659320 | 4/1938 | Fed. Rep. of Germany . |
| 965743 | 9/1950 | France . |
| 862812 | 3/1961 | United Kingdom . |

Primary Examiner—Joseph E. Valenza
Assistant Examiner—David A. Bucci

[57] ABSTRACT

The specification discloses a device for lifting and transporting an article such as a drum. The device includes a mobile frame (2) an actuating lever (20) upon which are pivotally connected hooks (16) which engageable with the top seam (22), of the drum (1). In use, the mobile frame is wheeled so as to straddle the drum, the lever (20) being rotated whereupon the hooks (16) engage the top seam of the drum. Continued rotation of the lever causes an upward and rearward movement of the hooks so that the drum is maintained in a stable position in the frame and in which the weight of the drum is fully borne by the frame.

14 Claims, 8 Drawing Figures

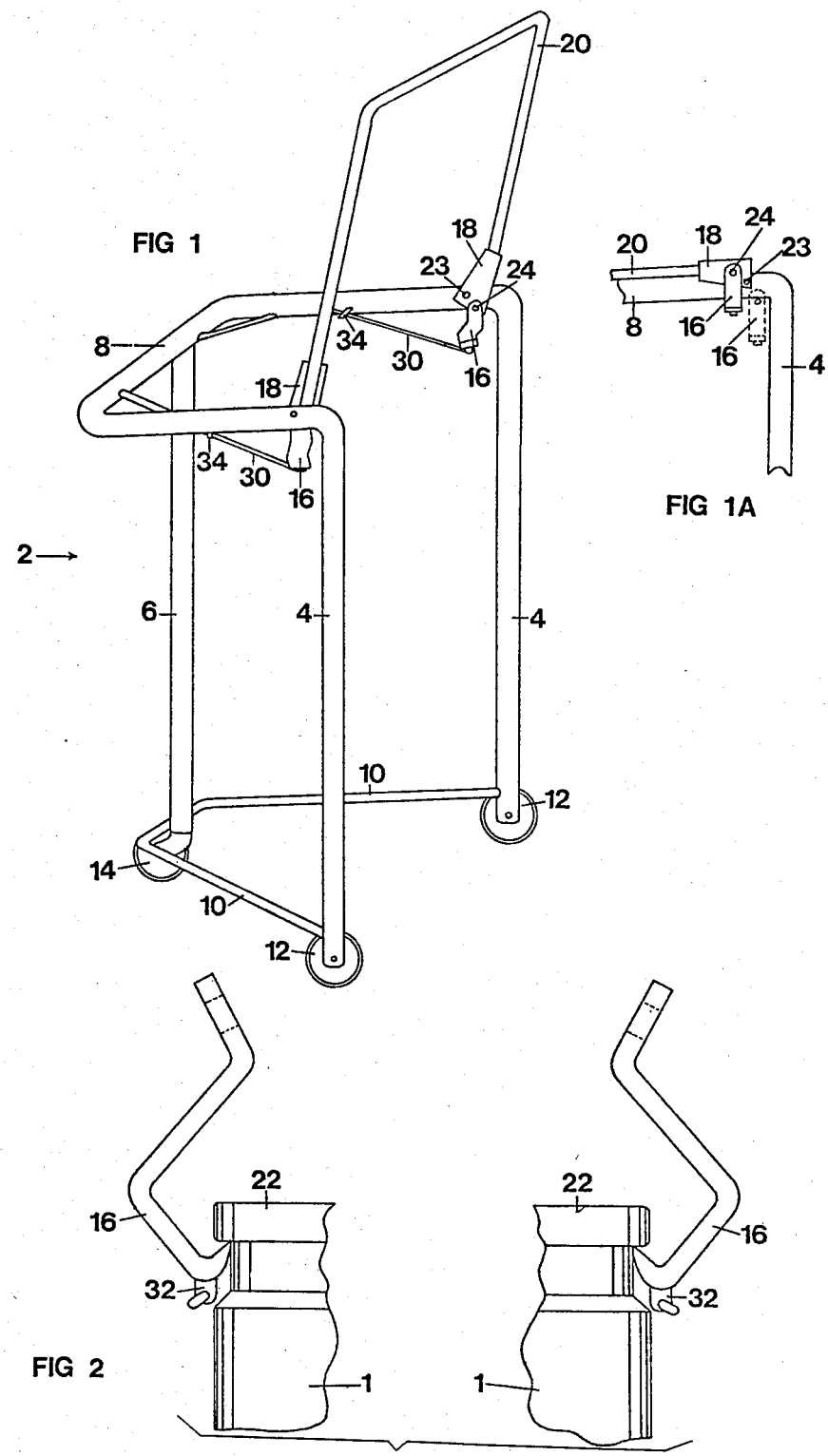

LIFTING DEVICE

This invention relates to a device for lifting articles particularly but not exclusively articles such as metallic drums of large capacity i.e. of the order of 200 liters.

According to the present invention there is provided a device for lifting an article, said device comprising a mobile frame, a pair of engagement members which, in use, engage the article to be lifted, and an actuator which is pivotally connected so said frame about a first axis, said engagement members being connected to said actuator for pivotal movement relative thereto about a second axis, said actuator being rotatable between first and second positions in which, in the first position, said engagement members are at a first level relative to the frame and said second axis is located at a first lateral position relative to said first axis, and, in the second position, said engagement members are at a second level, vertically higher than said first level, relative to the frame and said second axis is located on a second lateral position relative to said first axis, said second lateral position being on the opposite side of said second axis to the said first lateral position, said device including abutment means to restrain movement of said actuator beyond its second position, and wherein, in use, an article is supported by said engagement members and the weight thereof tends to rotate said actuator into engagement with said abutment means.

In use of the device the frame is brought up to the article, the engagement members engaged therewith and then the actuator is operated which causes elevation of the engagement members and consequently of the article. The lateral shifting of the members functions as an over-centre arrangement so that once the article has been elevated its weight is fully borne by the frame.

The invention will now be further described with reference to the accompanying drawings, in which:

FIG. 1 is a perspective view of a preferred form of the invention;

FIG. 1A illustrates upward and rearward movement of the hooks;

FIG. 2 illustrates diagrammatically how the apparatus of FIG. 1 can be used to lift a large capacity drum;

Figure 5:
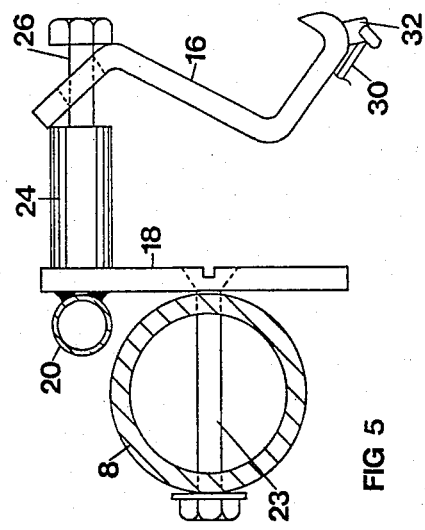
FIG. 5 is a similar view to FIG. 4 but with the handle rotated downwardly.

The apparatus illustrated in FIG. 1 is especially suited for lifting a large capacity drum 1, which preferably comprises a well known 44 gallon drum. Of course it could be dimensioned so as to be suitable with drums of other sizes. It comprises a mobile frame 2 having a forward pair of uprights 4 and a rear upright 6. The upper ends of the uprights are jointed by a generally U-shaped top support bar 8. The lower ends of the legs are interconnected by lower braces 10. The lower ends of the forward legs 4 are provided with fixed axis wheels 12 whereas the rear upright 6 is provided with a swivel mounted wheel 14.

The device includes a pair of opposed hook members 16 which are suspended from plates 18 which in turn are pivotally connected to the forward portions of the top bar 8. The plates 18 are interconnected by a generally U-shaped handle 20 which also serves as a lever to effect rotation of the plates 18 and consequential elevation of the hook members 16. In FIG. 1 the handle 20 is in an upright position in which it located in a plane inclined slightly forwardly relative to the vertical, it being stable in that position by engagement of the ends of the handle with the top support bar 8 as shown.

Figure 4:
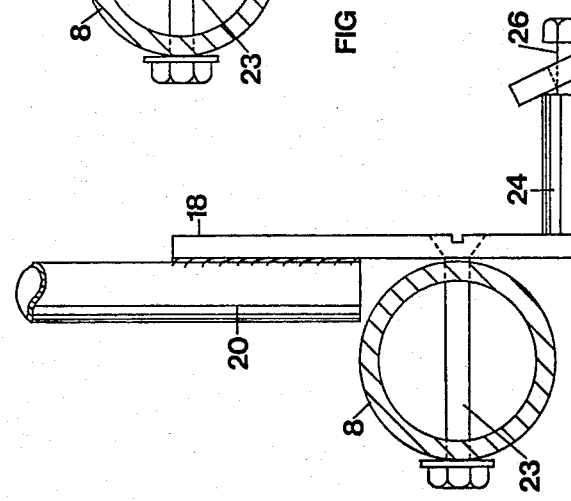
FIG. 4 is a sectional view taken along the line 4—4 marked in FIG. 3.
Figure 3:
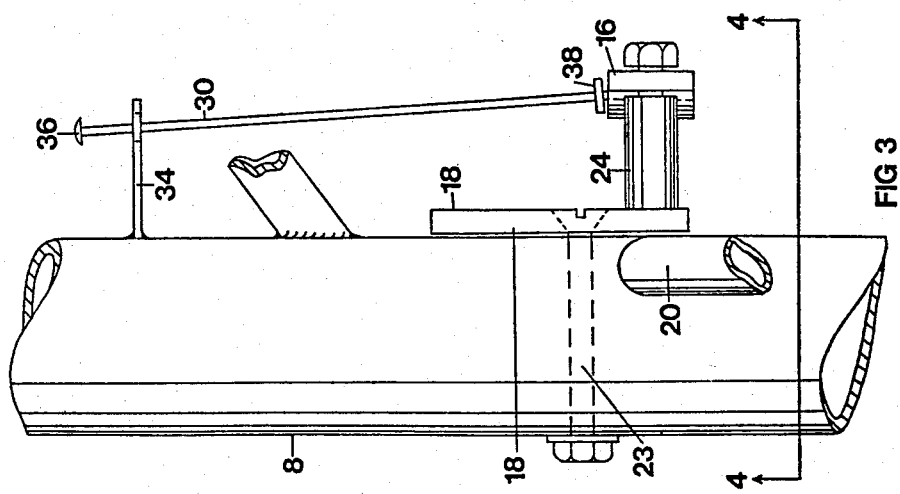
FIG. 3 is a plan view of part of the apparatus shown in FIG. 1.

FIGS. 3 to 5 illustrate in more detail the preferred configuration of the plates 18 and hook members 16.

Referring firstly to FIG. 3 it will be seen that the plates 18 are pivotally connected to the bar 8 by means of threaded studs 23. The hook members 16 are mounted on the end of shafts 24 which are welded to the plates 18. The shafts 24 have reduced diameter portions 26 which extend through bores 28 in the hook members 16, the bores 28 being of larger diameter than the portions 26 so as to permit limited rotation of the hook members in the axial direction of the shafts 24.

Rotation of the hook members 16 about the reduced shaft portions 26 is limited by means of struts 30 one end of each of which passes through a respective boss 32 located at the bottom of the hook members 16. The other ends of the struts 30 passes through bores in a guide plates 34 welded to the bar 8, the free ends terminating in a heads 36, as seen in FIG. 3. The bores in the plates 34 are somewhat larger than the diameter of the struts 30, the arrangement being such that there is approximately 1 cm. of axial movement available to the struts 30 at any position of the handle 20 and this effectively limits the degree of rotation of the hook members 16. Washers 38 can be fixed on the struts 30 adjacent to the hook members 16 so as to limit movement of the struts 30 through the bosses 32.

Figure 6:
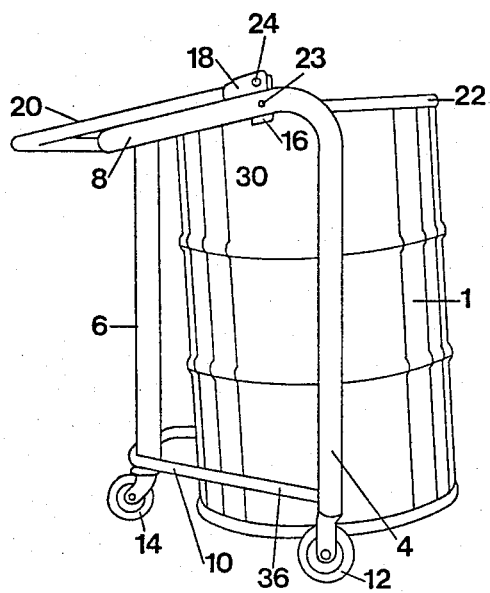
FIG. 6 is a side perspective showing the apparatus lifting a drum.

The mode of operation of the device will now be described. The framework 2 with its handle 20 in the upright position as shown in FIG. 1 is wheeled towards a drum 1 which is standing in an upright position. The framework 2 is wheeled about the drum until the lower side walls of the drum engage the braces 10 at points of contact 36, as seen in FIG. 6. At this stage, the lower parts of the hooks 16 will be engaged by the upper side walls of the drum and will be restrained from rotating rearwardly (i.e. toward the upright 6) by the struts 30, as described previously. The handle 20 is now rotated from the position shown in FIG. 1 to that in shown in FIG. 6. Rotation of the handle 20 causes rotation of the plates 18 and this has the effect of moving the hooks 16 upwardly and rearwardly as shown in FIG. 1A, the initial position of one of the hooks 16 being shown in broken lines. The hooks 16 will move upwardly over the curved surface of the drum 1 to a point a which they will engage the top seam 22 of the drum, as illustrated in FIG. 2. Once this engagement occurs, further rotation of the handle 20 will cause the drum to be elevated and tilted slightly rearwardly towards the rear upright 6, as seen in FIG. 6. The tilting is caused by the rearward movement of the hooks 16. In the carrying position as shown in FIG. 6, the drum 1 is securely engaged by the hook members 16 acting on its top seam 22 and is firmly wedged between the braces 10 near its lower portions. The secure attachment of the drum 1 to the device when the drum is in its elevated position is particularly important since when the drum is being transported any bumps or uneven surfaces will not cause relative movement between drum and the device. This is particularly important where the drum 1 is heavy and/or contains toxic substances.

As will be apparent from FIGS. 1, 1A, and 6, the entire weight of the drum 1 is borne by the device once the handle 20 is in its downward position. This is accomplished by the rearward movement of the hook member 16 from the position shown in broken lines in FIG. 1A where it is forward of the axis of the screws 23 to the position shown in full lines in FIG. 1A where it is rearwardly of the axis of the screws 23. In that position, the handle 20 bears against the upper part of the support bar 8, as best seen in FIG. 5. In other words the arrangement functions as an over-centre device whereby the weight of the drum 1 is borne by the device. The over-centre effect is made further secure by arranging for the side parts of the support bar 8 to slope somewhat downwardly towards the rear upright 6, as shown in FIGS. 1A and 6.

Figure 7:
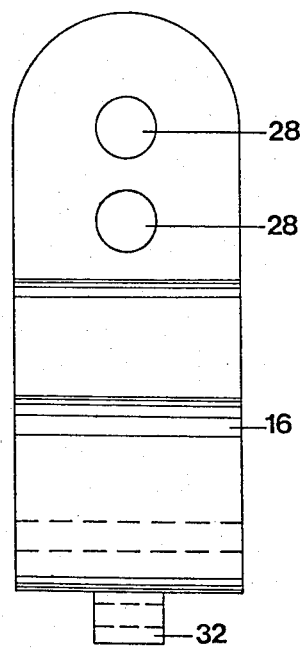
FIG. 7 illustrates a modified configuration of the hook members for use in the apparatus of the invention.

FIG. 7 shows a slightly modified form of hook 16. In this arrangement, the hook is provided with two bores 28 one beneath the other so as to permit adjustment in the height of the hook 16 so as to accommodate variations in drum sizes.

Many further modifications will be apparent to those skilled in the art without departing from spirit and scope of the invention.

We claim:

1. A device for lifting an article, said device comprising:
   (a) a mobile frame (2) having two forward uprights (4) connected at their upper ends by an upper support bar (8) and at their lower ends by a lower support bar (10), said support bars being generally U-shaped so that said two forward uprights define an open face adapted in use to receive the article;
   (b) a pair of engagement members adapted to engage the article to be lifted;
   (c) an actuator (18) having a U-shaped handle (20), the actuator being pivotally connected to said upper support bar of the frame about a first axis located near said forward uprights, said engagement members being connected to said actuator for pivotal movement relative thereto about a second axis, said actuator being rotatable by the handle between a first position where the article is not engaged and a second position where the article is in use engaged in which, in the first position, said engagement members are at a first level relative to the frame and said second axis is located at a first lateral position relative to said first axis, and, in the second position, said engagement members are at a second level, vertically higher than said first level, relative to the frame and said second axis is located at a second lateral position relative to said first axis, said second lateral position being on the opposite side of said second axis to said first lateral position, said handle extending in a generally upright plane in the first position and a generally horizontal plane in the second position; and
   (d) abutment means (8) to restrain movement of said actuator beyond its second position, and wherein in use, an article is supported by said engagement members and the weight thereof tends to rotate said actuator into engagement with said abutment means.

2. A device as claimed in claim 1 wherein the free ends of said U-shaped handle are fixedly connected to actuating plates (18) which are pivotally connected to said upper supports bar at said first axis and to which said engagement members are pivotally connected.

3. A device as claimed in claim 2 wherein the handle is held stable in its first position by abutment of the free ends of said U-shaped handle with said upper support bar.

4. A device as claimed in claim 2 wherein the arrangement of the handle, actuator plates and engagement members is such that the handle functions as a lever with a substantial mechanical advantage.

5. A device as claimed in claim 4 wherein said mechanical advantage is approximately 10:1.

6. A device as claimed in claim 1 wherein said engagement members comprise hooks.

7. A device as claimed in claim 6 wherein said hooks are mounted upon shafts (24) which extend from said actuating plates for rotation about said second axis, the mounting being such as to permit limited rotation about third axes which are transverse relative to the said shafts.

8. A device as claimed in claim 1 including restraining means (30, 34) to limit rotational movement of said engagement members about said second axis.

9. A device for lifting a drum (1) having a top seam (22) said device comprising: a mobile frame (2); an upper support bar (8); a pair of inwardly facing hook members (16) which, in use, engage the top seam of the drum to be lifted; a generally U-shaped handle actuator (18, 20) which is pivotally connected to said upper support bar about a first axis, said hook members being connected to said actuator for pivotal movement relative thereto about a second axis, said actuator being rotatable between first and second positions in which, in the first position, said actuator extends in a generally upright plane and said hook members are at a first level relative to the frame and said second axis is located at a first lateral position relative to said first axis, and, in the second position, said actuator extends in a generally horizontal plane and said hook members are at a second level, vertically higher than said first level, relative to the frame and said second axis is located at a second lateral position relative to said first axis, said second lateral position being on the opposite side of said second axis to said first lateral position; abutment means (8) to restrain movement of said actuator beyond its second position and wherein said hooks are mounted for rotation about said second axis upon shafts (24) which extend from said actuator, the mounting being such as to permit limited rotation about third axes which are transverse relative to the said shafts; a lower support bar (10) which is, in use, engaged by the sidewall of the drum when the actuator is in its second position; two forward uprights (4) connected near their lower ends by said lower support bar and at their upper ends by said upper support bar and near said first axis, said support bars being generally U-shaped whereby said two forward uprights define an open face of the frame into which, in use, the drum is moved; and wherein, in use, the drum is supported by said hook members and the weight thereof tends to rotate said actuator into engagement with said abutment means and to rotate said hook members about said third axis for more positive engagement thereof with the top seam of the drum.

10. A device as claimed in claim 9 wherein the free ends of said U-shaped handle are fixedly connected to actuating plates (18) which are pivotally connected to said upper support bars at said first axis and to which said hook members are pivotally connected.

11. A device as claimed in claim 10 wherein the handle is held stable in its first position by abutment of the free ends of the U-shaped handle with said upper support bar.

12. A device as claimed in claim 11 wherein the arrangement of the handle, actuator plates and hook members is such that the handle functions as a lever with a substantial mechanical advantage.

13. A device as claimed in claim 12 wherein said mechanical advantage is approximately 10:1.

14. A device as claimed in claim 9 including restraining means (30, 34) to limit rotational movement of said hook members about said second axis.

* * * * *